(12) United States Patent
Hernandez et al.

(10) Patent No.: US 8,203,942 B2
(45) Date of Patent: Jun. 19, 2012

(54) COMMUNICATIONS RESOURCE MANAGEMENT

(75) Inventors: Fernando J. Hernandez, Fullerton, CA (US); Jonathan D. Gray, Long Beach, CA (US); Michael J. Meier, Fort Wayne, IN (US); Jyoti D. Panjwani, Cerritos, CA (US); Dori Ruste, Torrance, CA (US); Russell W. Lai, Rancho Palos Verdes, CA (US); Deanna K. Harden, Fontana, CA (US)

(73) Assignee: Raytheon Company, Waltham, MA (US)

( * ) Notice: Subject to any disclaimer, the term of this patent is extended or adjusted under 35 U.S.C. 154(b) by 505 days.

(21) Appl. No.: 11/486,605

(22) Filed: Jul. 14, 2006

(65) Prior Publication Data

US 2011/0080897 A1    Apr. 7, 2011

(51) Int. Cl.
*G01R 31/08* (2006.01)

(52) U.S. Cl. ........................................ 370/230; 370/235

(58) Field of Classification Search .................. 370/230, 370/235
See application file for complete search history.

(56) References Cited

U.S. PATENT DOCUMENTS

| | | | | |
|---|---|---|---|---|
| 5,987,068 A * | 11/1999 | Cassia et al. | ................... | 375/281 |
| 6,732,273 B1 * | 5/2004 | Byers | ............................ | 713/193 |
| 2003/0158963 A1 * | 8/2003 | Sturdy et al. | ................... | 709/238 |
| 2003/0235167 A1 * | 12/2003 | Kuffner | ......................... | 370/335 |
| 2005/0207416 A1 * | 9/2005 | Rajkotia | ........................ | 370/390 |
| 2005/0221759 A1 * | 10/2005 | Spadafora et al. | ............ | 455/41.2 |
| 2005/0273330 A1 * | 12/2005 | Johnson | ......................... | 704/246 |
| 2006/0039287 A1 * | 2/2006 | Hasegawa et al. | ............. | 370/238 |
| 2006/0092865 A1 * | 5/2006 | Williams | ....................... | 370/310 |
| 2006/0154673 A1 * | 7/2006 | Khitrik et al. | ............... | 455/452.2 |
| 2007/0047570 A1 * | 3/2007 | Benveniste | .................... | 370/448 |
| 2007/0240126 A1 * | 10/2007 | Allen | ............................. | 717/130 |
| 2007/0271504 A1 * | 11/2007 | Horvitz | ......................... | 715/513 |
| 2007/0273871 A1 * | 11/2007 | Galli | ......................... | 356/139.01 |

* cited by examiner

*Primary Examiner* — Derrick Ferris
*Assistant Examiner* — Peter Cheng
(74) *Attorney, Agent, or Firm* — Cantor Colburn LLP

(57) ABSTRACT

A communications resource management system. The system includes a first module for prioritizing incoming messages and a second module for steering the messages in response to the prioritization by the first module. The first module assigns a message priority to each message based on a plurality of parameters such as mission mode, message type, and timeliness factor. The second module selects the most optimal communications resource for the message with the highest message priority by assigning a transmitter priority to each communications resource based on a plurality of factors such as estimated message arrival time, availability, and waveform compatibility. The message with the highest message priority is steered to the communications resource with the highest transmitter priority at the moment the message is sent. The first and second modules are each implemented using decision tree logic.

19 Claims, 4 Drawing Sheets

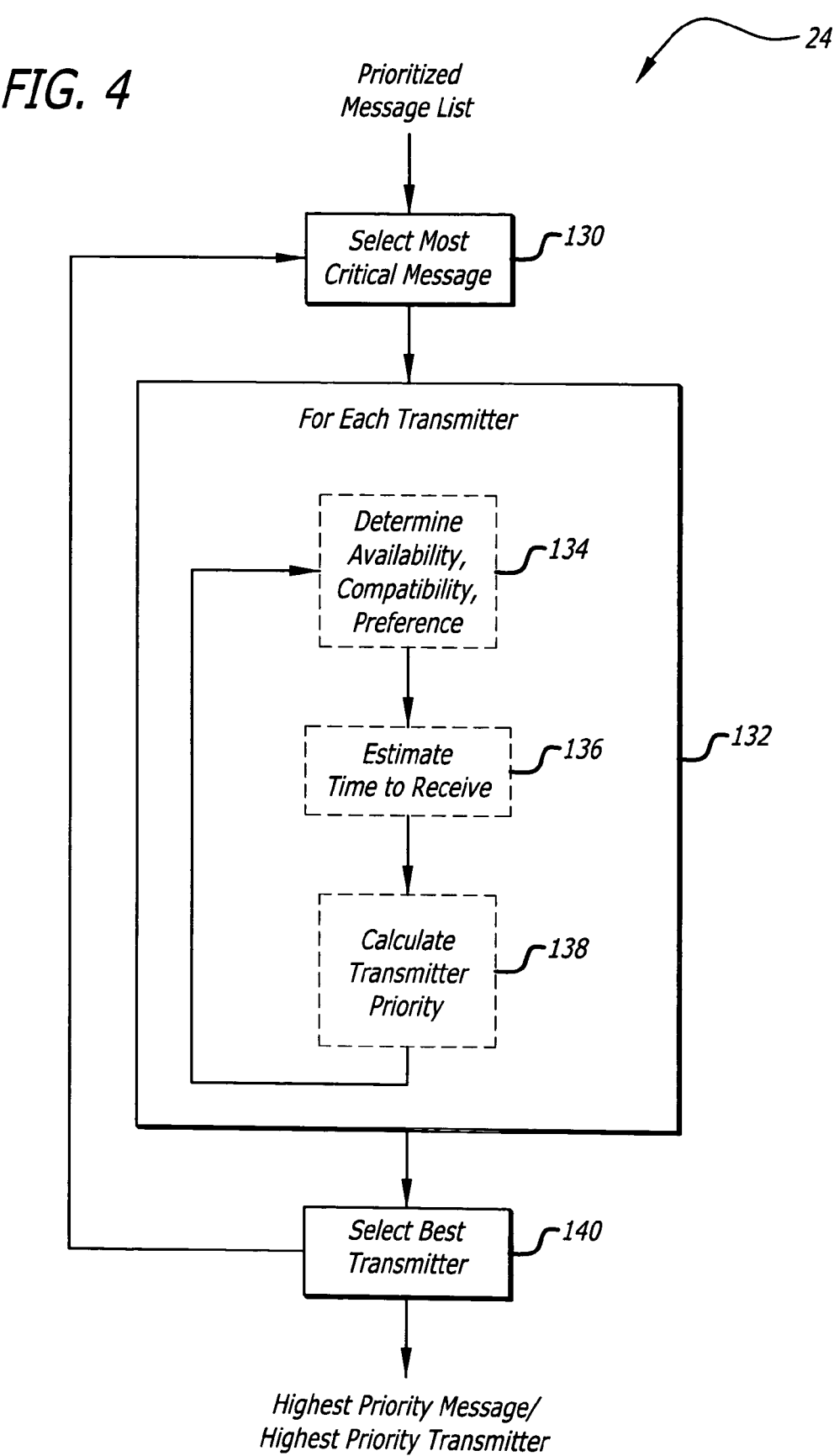

COMMUNICATIONS RESOURCE MANAGEMENT

BACKGROUND OF THE INVENTION

1. Field of the Invention

The present invention relates to communications systems. More specifically, the present invention relates to systems and methods for automatically managing a plurality of communication resources.

2. Description of the Related Art

The transformation of the Department of Defense that is currently underway will continue to exert enormous pressure on communications and bandwidth. For the foreseeable future, tactical- and theater-level military communications will need to provide communications management functionality to enable network centric operations. This paradigm shift requires moving from dedicated point-to-point links to flexible, managed networked communications that meet the needs of pre-planned mission objectives and can also adapt and respond to unscheduled events during mission execution.

For example, an Airborne Warning and Control System (AWACS) utilizes a large aircraft flying in a safe region to carry out airborne surveillance and command and control functions for tactical and air defense forces. An AWACS aircraft typically has a large number of communications systems onboard for communicating with a large variety of different destinations (ground forces, aircraft, command centers, satellite links, etc.). Each of these communications resources, however, is usually dedicated to a particular task. In a multi-application, multi-channel environment, one set of resources can easily reach overload while another set has untapped, inaccessible surplus resources. Currently, there is no way to automatically reallocate resources.

In addition, legacy communications point-to-point links typically provide service on a first-come, first-serve basis, often in a stove-piped; dedicated resource method. With a first-in, first-out model, much of the tight RF (radio frequency) bandwidth is wasted as non-critical traffic is allowed to precede critical traffic. Today, no protocols exist for overall message prioritization and multiple path selection of non-IP (interne protocol) traffic. On the other hand, IP protocols, originally designed for wired infrastructures, are too coarse-grained for wireless communications environments and fail to address non-IP (legacy) traffic.

Isolated portions of these problems are currently handled via intervention by the platform's communication administrators. Most of the current solutions are operator intensive and fail to adapt to increasing urgency of messages over time. In addition, they have no way to readily adapt to shifting mission priorities quickly and automatically.

Hence, a need exists in the art for system or method for automatically managing a plurality of communications resources.

SUMMARY OF THE INVENTION

The need in the art is addressed by the communications resource management system of the present invention. The novel system includes a first module for prioritizing incoming messages and a second module for steering the messages in response to the prioritization by the first module. The first module assigns a message priority to each message based on a plurality of parameters such as mission mode, message type, and timeliness factor. The second module selects the most optimal communications resource for the message with the highest message priority by assigning a transmitter priority to each communications resource based on a plurality of factors such as estimated message arrival time, availability, and waveform compatibility. The message with the highest message priority is steered to the communications resource with the highest transmitter priority. The first and second modules are each implemented using decision tree logic.

BRIEF DESCRIPTION OF THE DRAWINGS

FIG. 4 is a flow chart showing an illustrative implementation of a message steering module of a CRM designed in accordance with the present teachings.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The communications resource management approach of the present invention provides an automated method for dynamic, multi-channel communications management that controls the allocation of the finite resources at its disposal in a manner that permits effective execution of mission communications under time constrained and traffic intensive conditions. The novel approach optimizes the use of communications assets by dynamically prioritizing network traffic and steering traffic flows to the most appropriate communications path available.

Figure 1:
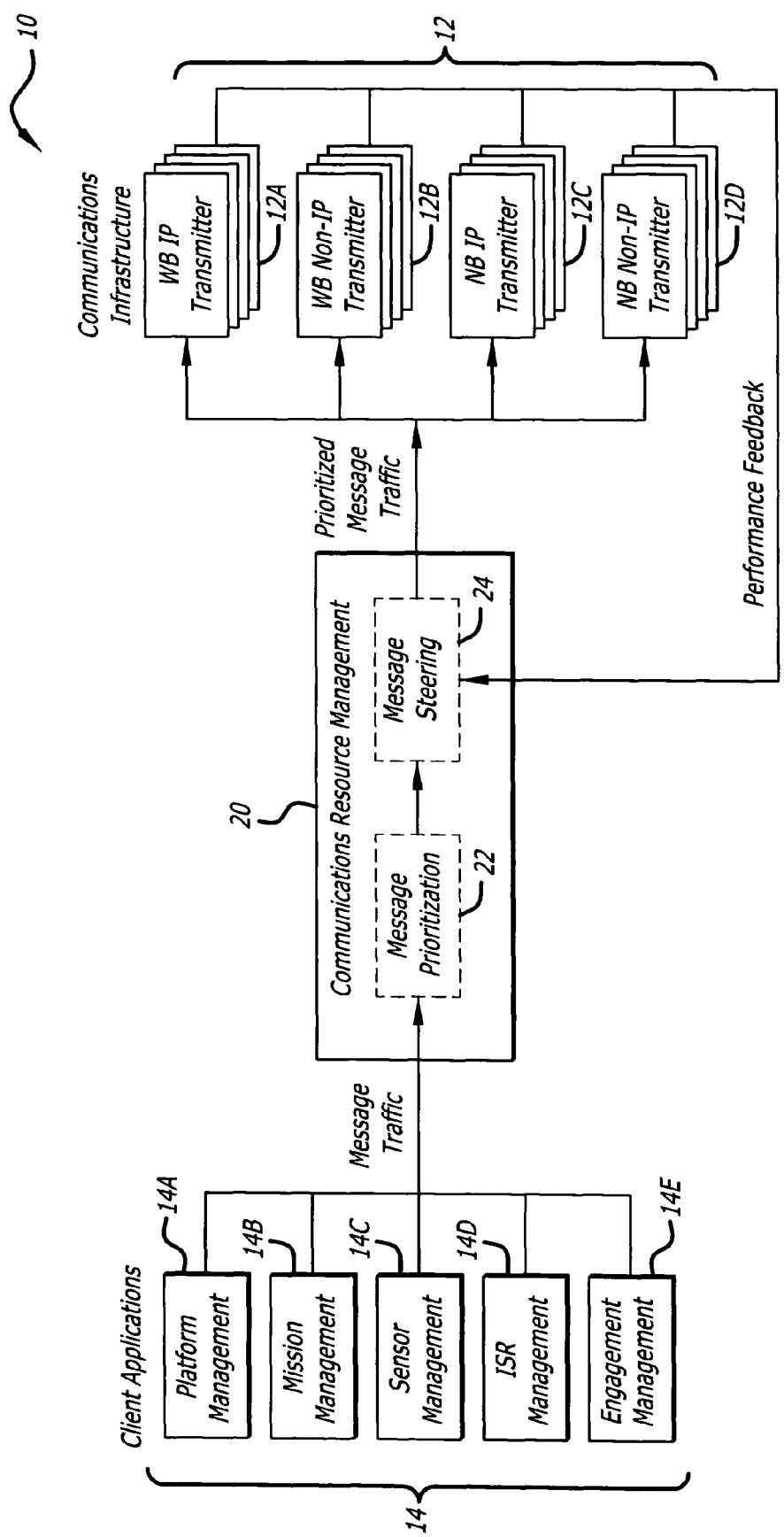
FIG. 1 is a simplified block diagram of an illustrative overall system having a plurality of communications resources managed by a communications resource management system (CRM) designed in accordance with an illustrative embodiment of the present teachings.

FIG. 1 is a simplified block diagram of an illustrative overall system 10 having a plurality of communications resources managed by a communications resource management system 20 designed in accordance with an illustrative embodiment of the present teachings. The overall system 10 includes several communications resources 12, which may include wideband IP transmitters 12A, wideband non-IP transmitters 12B, narrowband IP transmitters 12C, and narrowband non-IP transmitters 12D.

The communications resource management (CRM) system 20 receives message traffic from client applications 14 and selects the most critical traffic for each destination based on the latest mission priorities and system requirements and the most effective path to the destination based on real-time performance feedback from the transmitters 12. As shown in FIG. 1, the CRM 20 may receive messages from client applications 14 such as platform management 14A, mission management 14B, sensor management 14C, ISR (Intelligence, Surveillance, and Reconnaissance) management 14D, and engagement management 14E. The CRM 20 then prioritizes the incoming message traffic and determines which messages should be sent to which transmitters 12.

In accordance with the teachings of the present invention, the CRM 20 is a two-tiered rule-based mechanism that optimizes the use of multiple communications channels for both IP and non-IP message traffic in a dynamic mission environment. The first tier, the message prioritization module 22, assigns a priority to each message, and the second tier, the message steering module 24, determines an optimal routing for the message. The CRM front-end (message prioritization module 22) is adapted to capture operational information relevant to each application's communications requirements and to employ measurable criteria to create and assign precedence levels to traffic flows. The CRM back-end (message steering module 24) monitors performance levels of all available communications channels and dynamically assigns traffic flows to the most appropriate radio channel to ensure expedient transmission.

In an illustrative embodiment, each tier uses simple decision tree logic to determine a weighted sum for priority and routing options for each message several times a second. First tier decision trees can be designed to be easily customized to dynamically factor in message type, timeliness requirements, priority, sender, addressee, or other parameters that are deemed appropriate. Second tier decision trees can be designed to dynamically assign traffic flows to the most appropriate channel to ensure expedient delivery using factors such as bandwidth, resource availability, distance, and number of hops required.

The CRM architecture has the flexibility to be employed in both non-IP (legacy) and IP-based communications environments, and in mixed environments. Emerging military networked radio systems will incorporate IP-based architectures that facilitate the provisioning of Quality of Service (QoS) through commercial standards based mechanisms such as Differentiated Services (DiffServ) and Integrated Services (IntServ). The CRM framework architecture can be designed to interoperate with and enhance DiffServ and IntServ.

The CRM can also be designed to make use of a PBNM (Policy Based Network Management) structure. A PBNM system is a set of networking tools that promises to capture broad descriptions (policies) of what should happen in a network and transform these descriptions into configuration changes and deliver them to the network devices. These policies will contain rules that define how network resources can be used, or how applications and users should be served to support any particular mission. A PBNM can be tailored to enhance warfighter capabilities by distributing a commander's intent as doctrine, policy, or plan to subordinate domains, such as Communications Management/Communications Resource Management, which in turn, communicate directly with network devices (e.g., routers, switches) to enforce traffic management.

A basic overview of the general PBNM system architecture is necessary to understand its operation. The architecture includes the following elements: Policy Console (PC), which is the graphical user interface used by the network personnel to construct policies, deploy policies, and monitor the status of the PBNM system; Policy Decision Point (PDP), which is the real time process that makes decisions based on policy rules and the state of the services those policies manage; and Policy Enforcement Point (PEP), which is the agent running on or within a network resource that enforces a policy decision handed over by the PDP and/or makes a configuration change.

Figure 2:
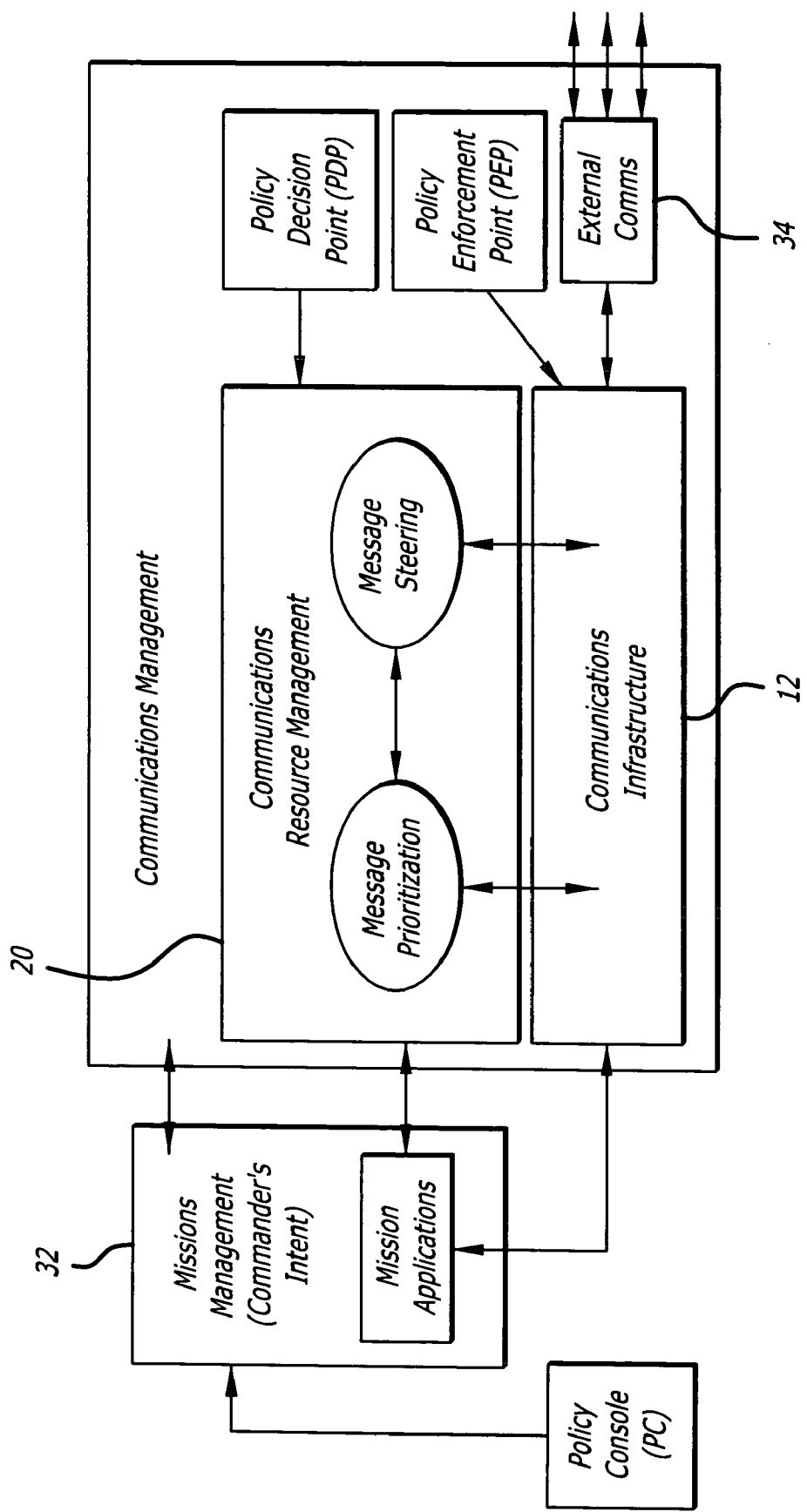
FIG. 2 is a simplified block diagram showing how the CRM of the present invention works within a PBNM (Policy Based Network Management) system.

FIG. 2 is a simplified block diagram showing how the CRM 20 of the present invention works within a PBNM system. The CRM 20 is a PDP, making decisions on message priorities using policies constructed by the PC, which is part of Missions Management 32. The Communications Infrastructure 12 is a PEP, implementing decisions made by the CRM 20 by transmitting selected messages via selected transmitters (to external communications 34).

The CRM approach of the present invention provides a mechanism that gathers mission requirements pertinent to the message flows that will be serviced and continually updates assigned priorities as tactical situations evolve. Understanding the current mission mode, application domain, mission role and the associated performance requirements coupled with active monitoring of network and link performance form the basis for the CRM decision logic to sort, prioritize, schedule, queue, and steer message flows in the most efficient fashion via the most appropriate path(s). Fine-grained prioritization and the associated resource pairing in a real-time, responsive fashion provide a higher level of robustness beyond current QoS and resource management constructs.

In an illustrative embodiment, the CRM front-end (message prioritization module 22) uses a parameter-driven rules-based mechanism at the heart of the decision logic. Parameters used by the decision logic can be included with the message (via a wrapper or function parameters) or the prioritization module 22 can include functions designed to derive the parameters from information such as the socket number used, or the infrastructure services being requested. Parameters may also be provided from other parts of the overall system. A decision tree combines the various parameters to select the most critical message.

Figure 3:
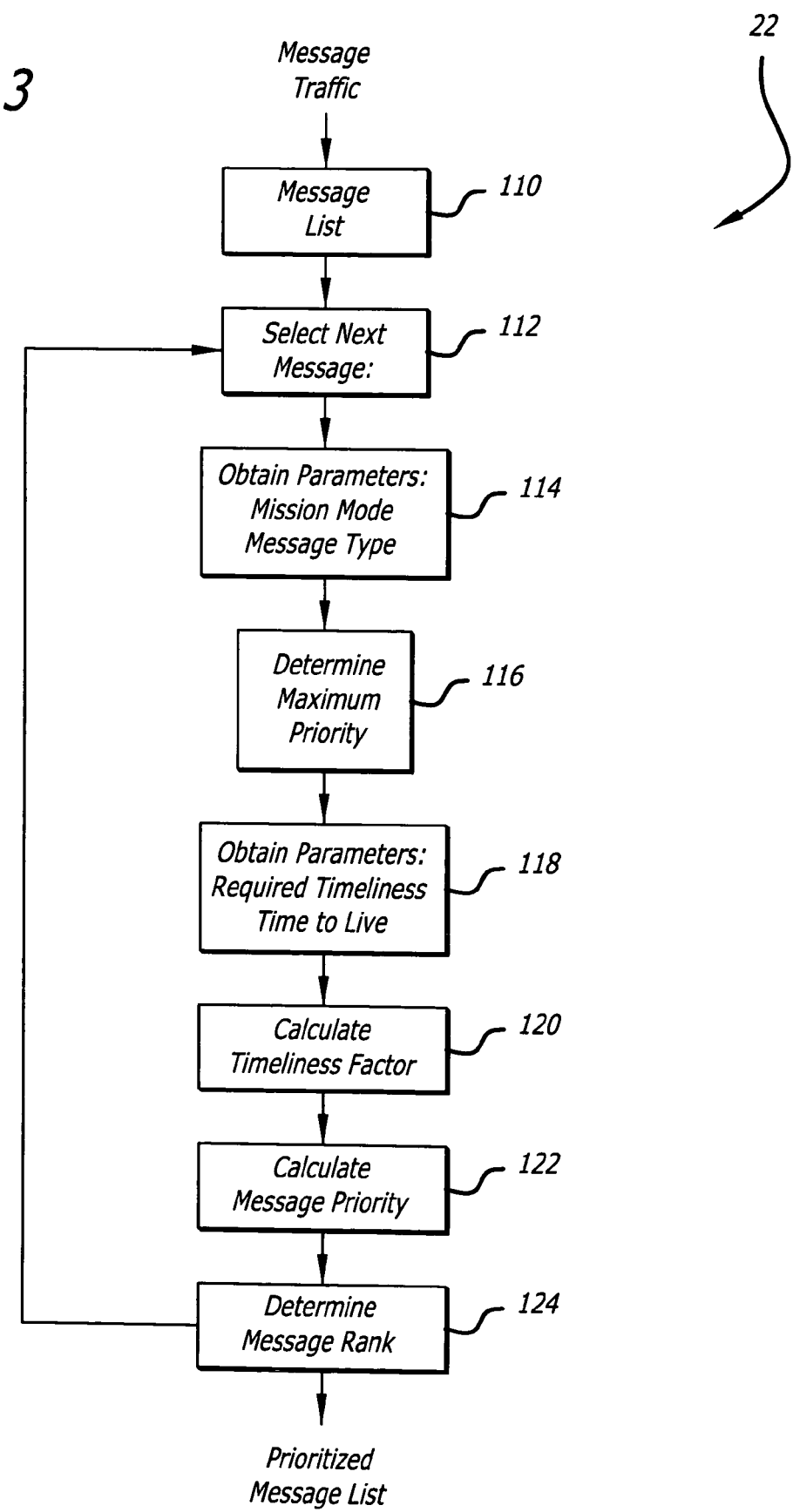
FIG. 3 is a flow chart showing an illustrative implementation of a message prioritization module of a CRM designed in accordance with the present teachings.

FIG. 3 is a flow chart showing an illustrative implementation of a message prioritization module 22 of a CRM designed in accordance with the present teachings. The message prioritization module 22 is a parameter-driven flexible decision logic framework that continuously prioritizes and queues message traffic based on the current policy, situation, or commander's intent. First, at Step 110, the message prioritization module 22 maintains a message list of all the messages from the incoming message traffic that need to be serviced and determines a priority for each message in the list depending on several predetermined parameters.

At Step 112, the message prioritization module 22 selects the first (or next) message in the list. At Step 114, it obtains the parameters used to help determine priority. In the illustrative implementation, the CRM uses a "Mission Mode" parameter to help determine priority. The present invention uses a global overview approach, both in the allocation of communications resources, as well as in the prioritization methodology. The Mission Mode parameter provides information on what the overall platform is trying to accomplish, i.e., the current emphasis of the mission team. The CRM is thus mission and environment aware to provide up-to-the-moment sensor inputs to the decision trees. For example, Mission Modes for a C2 (Command and Control) team might include: Ingress, Egress, Normal Operations, Under Attack, Search and Rescue, etc. The Mission Mode is common to the entire platform, not just the CRM.

In the illustrative embodiment, the CRM also obtains a "Message Type" parameter from each message that provides information on what the message is trying to accomplish; for example, whether it is addressing a command and control function or a non-critical email. The Message Types are organized into "Message Classes". For each Mission Mode, the most important Message Classes are given higher Rank and/or Maximum Priority. Examples of Message Classes might include Platform Status, Track Target, Mission Policy, Attack, Platform Defense, and Halt Attack. The Mission Mode (global viewpoint) in combination with the Message Type (narrow application viewpoint) is used to help determine the message priority.

At Step 116, the prioritization module 22 determines a "Maximum Priority" for the message from the Mission Mode and Message Type parameters. Different Message Classes may have different priority levels depending on the Mission Mode. For example, a close air support mission mode may assign higher priority to certain applications than a search and rescue mission. By having knowledge of which mission is currently being executed, the CRM can quickly and automatically make internal decisions about which applications should be given the highest priority. The Maximum Priority can be determined via a table lookup based on the current Mission Mode and Message Class.

In addition to understanding what the message is trying to accomplish, it may also be useful for the CRM to understand when the message needs to be received. To this end, the CRM can be designed to obtain "Required Timeliness" and "Time to Live" parameters (Step 118). The Required Timeliness provides information on the relative time by which the message is needed at its destination. The Time to Live (TTL) parameter is the relative time at which the request should be cancelled and its originating application notified. These parameters may be expressed in μsec or msec relative to time of the transmit message request. Default values may be specified in lookup tables, or they may be specified by the application.

At Step 120, the prioritization module 22 calculates a "Timeliness Factor" for the message from the Required Timeliness parameter and the Message Age (time since the transmit message request was created). As an example, the Timeliness Factor might be defined as Timeliness Factor= (Message Age/Required Timeliness)$^2$, increasing from 0 to 1 and holding until TTL.

Next, at Step 122, the "Message Priority" is calculated from the Maximum Priority and Timeliness Factor parameters. For example, the Message Priority may be computed by simply multiplying these two parameters. Priority increases as the message ages.

In addition, the CRM might want to use an additional parameter for overriding the Message Priority. In the embodiment of FIG. 3, the prioritization module determines a "Message Rank" parameter via table lookup based on the current Mission Mode and Message Class (Step 124). If the Mission Mode changes, the Message Rank could change even while in the Message List. A higher ranked message is selected for transmission before messages of lower rank regardless of priority, and can preempt a lower ranked message already in progress (if transmission resources support preemption). Preempted messages may be restarted, resumed or canceled. For example, in most Mission Modes, a Check Fire message would be selected before, and could preempt, any Inventory Report message.

A Message Priority and a Message Rank is calculated for each message in the message list using the steps described above. The prioritization module 22 outputs a prioritized message list, including the Rank and Priority of each message. Rank and Priority are regularly recalculated as needed to ensure selection of each moment's highest priority message for transmission. The ease of computation allows frequent reevaluation of trees which enables a highly dynamic response. Currently available decision tree engines, for example, are capable of recalculating Message Rank and Priority several times per second.

FIG. 4 is a flow chart showing an illustrative implementation of a message steering module 24 of a CRM designed in accordance with the present teachings. At Step 130, the message steering module 24 selects the most critical task from the prioritized message list at the moment resources are available (as determined by the message prioritization module 22, i.e. the message having the highest Rank and/or Priority). The steering module 24 then determines the best transmitter available for sending the message depending on factors such as availability and waveform compatibility, operator or system specified preferences, end-to-end throughput to the destination, transmitter performance and current queue size, and expected latency. A decision tree combines the various factors to select the best transmitter.

At Step 132, the message steering module 24 calculates a Transmitter Priority for each transmitter. This may be implemented through the following steps. At Step 134, determine if the transmitter is suitable for the selected message. This may include determining the Transmitter Availability, the Waveform Compatibility (whether the transmitter can output the waveform needed by the message), and the Transmitter Preference. As an example, the Transmitter Availability may be a binary code set to 1 (available) or 0 (not available). Similarly, the Waveform Compatibility can be defined as 1 (compatible) or 0 (not compatible). The Transmitter Preference can be number representing the preference for the transmitter to be used for certain types of messages (e.g., voice, long/short messages). This may be specified by systems engineers or the communications operator, or it can be based on performance data.

At Step 136, the message steering module 24 estimates the Time to Receive, the time for the message to arrive at its destination. The Time to Receive may be calculated by adding the following factors: Time to Service, Latency, Time to Transmit, and Route Duration. The Time to Service is the estimated time before the message will be removed from the transmitter's queue, and can be calculated as the queue size divided by the effective throughput. The Latency is the estimated time before transmission will begin—especially significant for satellite communications and some time-division protocols. The Time to Transmit is the estimated time to actually transmit the message, and may be calculated as the length of the message divided by the effective throughput. The Route Duration is the estimated time for forwarding after the initial transmission (i.e., the cost of hops).

At Step 138, the message steering module 24 calculates a Transmitter Priority representing how suitable that transmitter would be for the selected message. The Transmitter Priority may be calculated by multiplying the Transmitter Availability, Waveform Compatibility, Transmitter Preference, and Time to Receive.

After a Transmitter Priority value is calculated for each transmitter, the best transmitter (highest Transmitter Priority) is selected for the selected (highest Message Priority) message (Step 140). The process is then repeated for the next most critical message.

Thus, the CRM approach of the present invention provides an automated method for dynamic management of multiple communications resources. It minimizes non-optimal resource allocations and therefore provides greater flexibility to accommodate the demanding, time-critical tasking of widely dispersed assets over a complex battlefield. Its decision tree framework accommodates many-to-many (service requests-to-communications channels) by employing separate trees for prioritizing and allocating resources.

Note that the algorithms described above are illustrative embodiments. Different choices and weights of the parameters can be used without departing from the scope of the present teachings. The use of decision trees allows different sets of parameters to be easily swapped in and out in response to changing conditions. Furthermore, the design is robust enough to handle an extension of its architectural framework to include cognitive techniques and artificial intelligence.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A system for managing a plurality of wireless communications resources comprising multiple communications channels and a plurality of wireless transmitters associated therewith, the system comprising:
   a message prioritization module configured to continuously prioritize incoming messages from a plurality of client applications based upon a current military mission mode, wherein the military mission mode comprises a command and control mission mode selected from the group consisting of ingress, egress, normal operations, "under attack", and search and rescue, said message prioritization module outputting a prioritized message list in response thereto; and
   a message steering module configured to steer said prioritized messages to a most suitable wireless communications resource of the plurality of wireless communications resources in response to said prioritized message list and a calculated transmitter priority for each of the plurality of wireless transmitters,
   wherein said message steering module dynamically selects a most suitable wireless communications transmitter from the plurality of associated wireless transmitters for a message with a highest priority by calculating the wireless communications transmitter priority for each wireless communications resource based on a plurality of factors selected from the group consisting of a transmitter availability, a waveform compatibility, an operator or system specified preference, end-to-end throughput to a destination, a transmitter performance, a current queue size, and an expected latency, and by determining a suitability of each associated wireless transmitter to transmit said message with the highest priority over a most effective path by using realtime performance feedback from the plurality of associated wireless transmitters,
   wherein each of the plurality of wireless transmitters are configured to operate on a different communication channel of the multiple communications channels.

2. The system of claim 1, wherein said message prioritization module assigns a message priority to each message based on a plurality of parameters.

3. The system of claim 2, wherein said parameters includes a change in the current military mission mode representing a real-time change in an overall system objective.

4. The system of claim 2, wherein said parameters includes a change in the message type representing a real-time change in a message objective.

5. The system of claim 2, wherein said parameters includes a timeliness factor representing when a message needs to be received.

6. The system of claim 1, wherein said message steering module steers said message to a communications resource with a highest transmitter priority.

7. The system of claim 1, wherein said factors includes an estimated time for a message to arrive at its destination using said resource.

8. The system of claim 1, wherein said factors includes resource availability.

9. The system of claim 1, wherein said factors includes a waveform compatibility of said resource with said highest priority message.

10. The system of claim 1, wherein said for message steering module receives real-time performance feedback from the assigned wireless transmitter and reevaluates the most suitable wireless communications resource in response thereto.

11. The system of claim 1, wherein said multiple communications channels comprise two or more different communications channels selected from the group consisting of a wideband (WB) Internet Protocol (IP) channel, a WB non-IP channel, a narrowband (NB) IP channel, and a NB non-IP channel.

12. The system of claim 1, wherein the military mission mode comprises a close air support mission mode.

13. A computer-implemented method for managing a plurality of wireless communications resources comprising a plurality of wireless communications transmitters each configured to operate on a different one of a plurality of different communications channels, the method comprising:
   using a processor in a communications resource management system to prioritize incoming messages and output a prioritized message list based on a military mission mode, wherein the military mission mode comprises a command and control mission mode selected from the group consisting of ingress, egress, normal operations, "under attack", and search and rescue;
   reprioritizing said initially prioritized incoming messages in response to a change in a military system objective; and
   in response to said reprioritization, using said communications resource management system to steer said messages from a first wireless communication transmitter associated with one of the plurality of different communications channels to a different wireless communications transmitter associated with a different one of the plurality of different communications channels based upon realtime performance feedback from the plurality of wireless communications transmitters used by said communications resource management system to determine a most effective communications path and a plurality of parameters selected from the group consisting of a transmitter availability, a waveform compatibility, an operator or system specified preference, end-to-end throughput to a destination, a transmitter performance and a current queue size, and an expected latency.

14. A computer-implemented method for managing a plurality of wireless communications resources comprising a plurality of wireless communications transmitters configured to operate on different communications channels, the method comprising:
   using a processor in a communications resource management system, calculating a message priority for each of a plurality of incoming messages based on a current military mission mode, wherein the military mission mode comprises a command and control mission mode selected from the group consisting of ingress, egress, normal operations, "under attack", and search and rescue;

using the processor to output a prioritized message list determined from said current military mission mode and to select a message having a highest message priority therefrom;

calculating a wireless transmitter priority for each of said wireless communications transmitters based on plural second parameters of said resource and of said selected message including realtime performance feedback from each of the plurality of wireless communications transmitters, said plural second parameters being selected from the group consisting of a transmitter availability, a waveform compatibility, an operator or system specified preference, end-to-end throughput to a destination, a transmitter performance, a current queue size, and an expected latency;

selecting a wireless communications transmitter having a highest calculated transmitter priority;

steering said selected message to said selected wireless communications transmitter associated with a first communications channel;

using the processor to select a message having a next highest priority; and steering said selected next highest priority message to another one of the plurality of wireless communications transmitters having a suitable wireless transmitter priority, wherein said another one of the plurality of wireless communications transmitters is associated with a second communications channel different from the first communications channel.

15. A communications resource management system, the system comprising:

a communications resource management module comprising a message prioritization module and a message steering module operatively connected therein, wherein the message prioritization module is configured to receive plural messages from one or more client applications and to dynamically assign a different message priority to each message based upon a current military mission mode, wherein the military mission mode comprises a command and control mission mode selected from the group consisting of ingress, egress, normal operations, "under attack", and search and rescue;

said message prioritization module outputting messages in a priority order to the message steering module, wherein the message steering module is configured to sequentially receive the prioritized messages from the message prioritization module and to receive real-time performance feedback from each of a plurality of radio transmitters each associated with a different communications channel, said real-time performance feedback being used by said message steering module to assign a highest priority message to a preferred transmitter of the plurality of radio transmitters as determined by a plurality of transmitter priority parameters, wherein said plurality of transmitter priority parameters are selected from the group consisting of a transmitter availability, waveform compatibility, end-to-end throughput to a destination, transmitter performance and current queue size, and expected latency.

16. The system of claim 15, wherein said plurality of operational parameters further comprises a message class.

17. The system of claim 16, wherein said message prioritization module determines the highest priority message based upon a table look up based upon a current military mission mode and current message class of each of the plural messages.

18. The system of claim 15, wherein the message prioritization module is configured to reassign a message priority to each message in response to a change in a mission mode.

19. The system of claim 15, wherein the plurality of radio transmitters comprise two or more transmitters that operate using different waveform types and/or different communications protocols.

* * * * *